US009602409B2

(12) United States Patent
Kim et al.

(10) Patent No.: US 9,602,409 B2
(45) Date of Patent: Mar. 21, 2017

(54) APPARATUS AND METHOD FOR MULTILATERAL ONE-WAY COMMUNICATION

(71) Applicant: ELECTRONICS AND TELECOMMUNICATIONS RESEARCH INSTITUTE, Daejeon (KR)

(72) Inventors: Kyoung-Ho Kim, Gokseong-gun (KR); Jeong-Han Yun, Daejeon (KR); Heemin Kim, Daejeon (KR); Woonyon Kim, Daejeon (KR); Jungtaek Seo, Daejeon (KR); Eung Ki Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 207 days.

(21) Appl. No.: 14/561,826

(22) Filed: Dec. 5, 2014

(65) Prior Publication Data

US 2015/0365346 A1    Dec. 17, 2015

(30) Foreign Application Priority Data

Jun. 11, 2014   (KR) .......................... 10-2014-0070496

(51) Int. Cl.
*H04L 12/915* (2013.01)
*H04L 12/801* (2013.01)
*H04L 12/54* (2013.01)

(52) U.S. Cl.
CPC .............. *H04L 47/10* (2013.01); *H04L 12/56* (2013.01)

(58) Field of Classification Search
CPC ................................ H04L 47/10; H04L 12/56
See application file for complete search history.

(56) References Cited

U.S. PATENT DOCUMENTS

| 2004/0179524 | A1  | 9/2004  | Sasagawa et al. |
| 2008/0262714 | A1* | 10/2008 | Abramovich Ettinger ................. G01C 21/00 701/533 |
| 2010/0189119 | A1  | 7/2010  | Sawada |

(Continued)

FOREIGN PATENT DOCUMENTS

| JP | 2003-509907 A | 3/2003 |
| JP | 2004-193821 A | 7/2004 |

(Continued)

*Primary Examiner* — Jay P Patel
(74) *Attorney, Agent, or Firm* — LRK Patent Law Firm

(57) ABSTRACT

An apparatus and a method for multilateral one-way communication are provided. The apparatus includes a one-way input module unit, detachably mounted to a plurality of slots formed in a rail, for receiving data from an external transmission host and for transmitting the received data to an internal network through one-way communication; a one-way output module unit, mounted detachably to the plurality of slots formed in the rail, for transferring data of interest to an internal network through one-way communication, and transmitting data of interest to an external reception host, and a two-way module unit, mounted detachably to the plurality of slots formed in the rail, for performing data communication between the transmission host and the reception host in a bidirectional mode.

10 Claims, 7 Drawing Sheets

(56) References Cited

U.S. PATENT DOCUMENTS

2012/0042357 A1    2/2012  Mraz
2015/0142225 A1*  5/2015  Tonguz .................. B61L 19/06
                                                        701/19

FOREIGN PATENT DOCUMENTS

| | | |
|---|---|---|
| JP | 2005-160000 A | 6/2005 |
| JP | 2010-177722 A | 8/2010 |
| KR | 10-2006-0081401 A | 7/2006 |
| KR | 10-2011-0040004 A | 4/2011 |

* cited by examiner

APPARATUS AND METHOD FOR MULTILATERAL ONE-WAY COMMUNICATION

CROSS REFERENCE TO RELATED APPLICATION

This application claims the benefit of Korean Patent Application No. 10-2014-0070496, filed Jun. 11, 2014, which is hereby incorporated by reference in its entirety into this application.

BACKGROUND OF THE INVENTION

1. Technical Field

The present invention relates generally to an apparatus and a method for multilateral one-way communication and, more particularly, to an apparatus and a method capable of ensuring the reliability of data transmission in a one-way section of a network while maintaining advantages of physical one-way data transmission technology.

2. Description of the Related Art

Recently, network separation technology capable of transmitting data to an external network while protecting an internal network has been developed. Thus, various network separation technologies have also been developed.

One-way data transmission technology is one of such network separation technologies. One-way data transmission technology is classified into logical one-way data transmission technology and physical one-way data transmission technology according to an implementation scheme.

Among the logical one-way data transmission technology are approaches of designating read authority and write authority for sharing storage or of recruiting PC virtualization. These approaches, however, are vulnerable to external intrusion due to various problems including their own structural weakness, difficulty in materialization, etc.

Structured such that the physical path itself is one way, a physical one-way data transmission technology enjoys the advantage of making internal intrusion impossible when the system is attacked from outside. However, in a physical one-way data transmission scheme, since it is not possible for the transmission side to know the state of the reception side, the reliability of data transmission may not be ensured in a one-way section of a network. Additionally, for conventional existing apparatuses, only 1:1 communication is possible. Thus, the implementation of N:M communication requires additional necessary communication network sections with respective capable equipment, or with respective relay servers, resulting in a complicated and inefficient network configuration, which is problematic.

A physical one-way data transmission apparatus is network security equipment allowing data to travel in only one direction, that is, from an internal network to an external network, and is used in guaranteeing information security, while physically blocking data transmission from an external network to an internal network thereby fundamentally preventing intrusion via the external network. In the physical one-way data transmission scheme, transmission is usually carried out through an unshielded twisted pair (UTP) cable in which the RX line is cut, through a serial cable in which the reception line is cut, or with an optical converter in which the RX line is removed.

However, the approach of physically transmitting data in one direction by cutting a reception line has the risk of data loss. There are several suggested solutions to this problem, such as adjusting a buffer size and transmission speed, the employment of a separate control line (exclusive for data), and the like. However, in the state in which it is not possible for the transmission side to know the state of the reception side, the methods of adjusting buffer size or transmission speed are not perfect solutions for the situation where it is impossible to know the state of the reception side. Additionally, the separate control line itself may be abnormally used as an intrusion path.

A related prior art is found in Korean Patent Application Publication No 10-2011-0040004 which discloses the transmission of data from a high security network to a low security network

SUMMARY OF THE INVENTION

Accordingly, the present invention has been made keeping in mind the above problems occurring in the conventional art, and an object of the present invention is to provide an apparatus and a method for multilateral one-way communication, which can eradicate the probability of intrusion from an external network to an internal network, for transmitting data, support reliable one-way data transmission from the internal network to the external network, and variably change the physical configuration of the system under N:M communication environments to provide optimal user environments.

In accordance with an aspect of the present invention, there is provided an apparatus for multilateral one-way communication, including a one-way input module unit, detachably mounted to a plurality of slots formed in a rail, for receiving data from an external transmission host and for transmitting the received data to inside of the apparatus through one-way communication; a one-way output module unit, mounted detachably to the plurality of slots formed in the rail, for transferring data of interest to the inside of the apparatus through one-way communication, the data of interest being to be transmitted to outside of the apparatus, and transmitting the transferred data to an external reception host; and a two-way module unit, mounted detachably to the plurality of slots formed in the rail, for performing data communication between the transmission host and the reception host in a bidirectional mode.

The one-way input module unit may include an external port connected to the transmission host; an external communication controller for receiving data from the transmission host in a bidirectional mode of communication with the transmission host; a one-way communication controller for transmitting data received from the external communication controller to the inside of the apparatus in one direction; an input module slot communication controller for transmitting the data received via the one-way communication controller according to an internal rail communication standard; and a port coupled with a currently mounted slot. The one-way communication controller may include a one-way transmission module unit for transmitting data from the external communication controller through a physical one-way section; a one-way reception module unit for receiving data transmitted through the physical one-way section; a feedback generation module unit for feeding back a reception result for the data through a control signal section, the data being transmitted through the physical one-way section; and a feedback processing module unit for receiving the data reception result fed back through the control signal section.

The one-way output module unit may include an external port connected to the reception host; an output module slot communication controller for interpreting information received through internal rail communication to extract data;

a one-way communication controller for transmitting data to the inside of the apparatus through a physical one-way section, the data being received through the output module slot communication controller; an external communication controller for transmitting data from the one-way communication controller to the reception host in a bidirectional mode of communication with the reception host; and a port coupled with a currently mounted slot. The one-way communication controller may include a one-way transmission module unit for transmitting data from the output module slot communication controller through the physical one-way section; a one-way reception module unit for receiving data transmitted through the physical one-way section; a feedback generation module unit for feeding back a reception result for data through a control signal section, the data being transmitted through the physical one-way section; and a feedback processing module unit for receiving the data reception result feedback through the control signal section.

The rail may include an apparatus control module mounting unit in which an apparatus control module unit for controlling transmission/reception of the data is mounted; and a slot mounting unit in which the plurality of slots are mounted.

Each of the plurality of slots may include a slot rail communication controller for receiving or transmitting data transmitted through any one of the one-way input module unit, the one-way output module unit, and the two-way module unit.

Any one of the plural slots may be mounted with N one-way input module units and M one-way output module units.

Any one of the plurality of slots may be mounted with the one-way input module unit and the two-way module unit.

Any one of the plurality of slots may be mounted with the one-way output module unit and the two-way module unit.

In accordance with another aspect of the present invention, there is provided a method of multilateral one-way communication, including receiving, by a one-way input module unit mounted detachably to a plurality of slots formed in a rail, data from an external transmission host; transferring, by the one-way input module unit, the received data through a one-way communication controller in the one-way input module unit in one direction; receiving, by an apparatus control module unit mounted in the rail, data from the one-way input module unit through rail communication; transferring, by the apparatus control module unit, the received data to a one-way output module unit mounted in an external transmission slot through rail communication; transferring, by the one-way output module unit, the received data through a one-way communication controller in the one-way output module unit in one direction; and transferring, by the one-way output module unit, the data received in one direction to an external reception host.

Receiving the data from the external transmission host may include performing two-way communication between the one-way input module unit and the transmission host.

Receiving the data from the one-way input module unit through the rail communication may include performing two-way communication between the apparatus control module unit and the one-way input module unit.

Transferring the received data to the one-way output module unit mounted in the external transmission slot through the rail communication may include performing two-way communication between the apparatus control module unit and the one-way output module unit.

Transferring the data received in one direction to an external reception host may include performing two-way communication between the one-way output module unit and the reception host.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
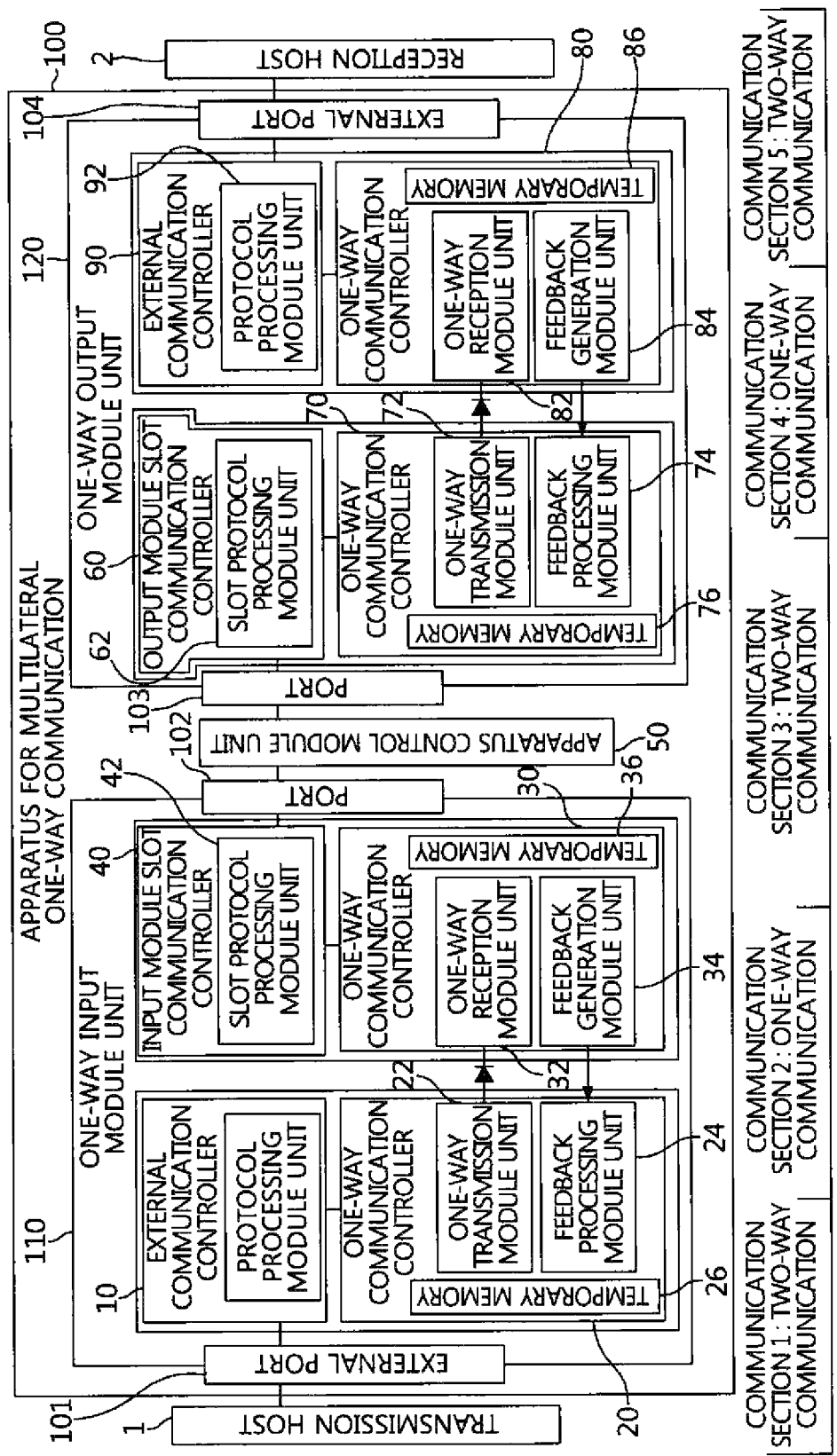
FIG. 1 is a configuration diagram of an apparatus for multilateral one-way communication according to an embodiment of the present invention.

The present invention may be variously changed and may have various embodiments, and specific embodiments will be described in detail below with reference to the attached drawings.

However, it should be understood that those embodiments are not intended to limit the present invention to specific disclosure forms and they include all changes, equivalents or modifications included in the spirit and scope of the present invention.

The terms used in the present specification are merely used to describe specific embodiments and are not intended to limit the present invention. A singular expression includes a plural expression unless a description to the contrary is specifically pointed out in context. In the present specification, it should be understood that the terms such as "include" or "have" are merely intended to indicate that features, numbers, steps, operations, components, parts, or combinations thereof are present, and are not intended to exclude a possibility that one or more other features, numbers, steps, operations, components, parts, or combinations thereof will be present or added.

Unless differently defined, all terms used here including technical or scientific terms have the same meanings as the terms generally understood by those skilled in the art to which the present invention pertains. The terms identical to those defined in generally used dictionaries should be interpreted as having meanings identical to contextual meanings of the related art, and are not interpreted as being ideal, or excessively formal meanings unless they are definitely defined in the present specification.

Embodiments of the present invention will be described in detail with reference to the accompanying drawings. In the following description of the present invention, the same reference numerals are used to designate the same or similar elements throughout the drawings and repeated descriptions of the same components will be omitted.

The present invention has characteristics of guaranteeing the reliability of data transmission in a one-way section of the network while enjoying the advantage of physical one-way data transmission technology. Furthermore, the present invention discloses an apparatus and a method for multilateral one-way communication in the form of a switch in which a detachable slot structure can be provided to establish an efficient configuration of an N:M multilateral network according to user network environments.

FIG. 1 is a configuration diagram of an apparatus for multilateral one-way communication according town embodiment of the present invention.

The apparatus 100 illustrated in FIG. 1 includes a one-way input module unit 110, a one-way output module unit 120, and an apparatus control module unit 50.

The one-way input module unit 110 functions to receive data (that is, external data) from a transmission host 1 in addition to having a one-way internal transmission function.

The one-way input module unit 110 includes an external communication controller 10, a one-way communication controller 20, a one-way communication controller 30, and an input module slot communication controller 40.

The external communication controller 10 provides a communication function (protocol processing of TCP, UDP and the like) with an external network, receives data from the transmission host 1 through an external port 101, and then transfers the corresponding data to the one-way communication controller 20. To this end, the external communication controller 10 includes a protocol processing module unit 12 that processes protocols of TCP, UDP and the like.

The one-way communication controller 20 transmits data in one direction. The one-way communication controller 20 includes a one-way transmission module unit 22 that transmits traffic (data) received from the external communication controller 10 to the one-way communication controller 30 through a physical one-way section of the network, a feedback processing module unit 24 that receives a traffic reception result from the one-way communication controller 30, which is transmitted through a control signal section of the network, and a temporary memory 26 that temporarily stores traffic in order to correct the loss of traffic (data) in a communication process.

The one-way communication controller 30 receives data from the one-way communication controller 20 through a physical one-way section of the network, and transfers the corresponding data to the input module slot communication controller 40. The one-way communication controller 30 includes a one-way reception module unit 32 that receives traffic transmitted through the physical one-way section of the network, a feedback generation module unit 34 that generates a reception result for the traffic transmitted through the physical one-way section of the network and transmits the reception result to the feedback processing module unit 24 through a control signal section of the network, and a temporary memory 36 that temporarily stores traffic in order to correct the loss of traffic (data) in a communication process.

The input module slot communication controller 40 outputs data, which is received through the one-way communication controller 30, to a port 102 according to an internal rail communication standard. The data output through the port 102 may be transmitted to the apparatus control module unit 50. To this end, the input module slot communication controller 40 includes a slot protocol processing module unit 42 that transmits the received data by using a protocol for performing internal rail communication.

The apparatus control module unit 50 controls input/output/input-output module functions, controls an apparatus configuration setting function, provides a mirroring function, and provides a packet transfer function.

The one-way output module unit 120 provides an external transmission function of data, and provides a one-way internal reception function. The one-way output module unit 120 includes an output module slot communication controller 60, a one-way communication controller 70, a one-way communication controller 80, and an external communication controller 90.

The output module slot communication controller 60 interprets information received through internal rail communication to extract data, and transfers the data to the one-way communication controller 70. To this end, the output module slot communication controller 60 includes a slot protocol processing module unit 62 that processes packets received through the internal rail communication and extracts data.

The one-way communication controller 70 transmits the data received through the output module slot communication controller 60 through a physical one-way section of the network. The one-way communication controller 70 includes a one-way transmission module unit 72, a feedback processing module unit 74, and a temporary memory 76. The one-way transmission module unit 72 transmits data to the one-way communication controller 80 through the physical one-way section of the network. The feedback processing module unit 74 receives a data reception result from the one-way communication controller 80. The temporary memory 76 temporarily stores data in order to correct the loss of traffic (data) in a communication process.

The one-way communication controller 80 receives data transmitted through the physical one-way section of the network, and transmits the data to the external communication controller 90. The one-way communication controller 80 includes a one-way reception module unit 82, a feedback generation module unit 84, and a temporary memory 86. The one-way reception module unit 82 receives the data transmitted from the one-way transmission module unit 72 through the physical one-way section of the network. The feedback generation module unit 84 generates feedback for the data received through the physical one-way section of the network, and transmits the feedback to the feedback processing module unit 74. The temporary memory 86 temporarily stores data in order to correct the loss of traffic in a communication process.

The external communication controller 90 transmits the data, which is received through the one-way communication controller 80, to a reception host 2 through an external port 104. To this end, the external communication controller 90 includes a protocol processing module unit 92 that processes and converts the data, which is received through the one-way communication controller 80, according to an external protocol (e.g., TCP, UDP and the like).

Through the above configuration, the one-way communication in FIG. 1 may be performed in the sequence of the transmission host 1 the one-way input module unit 110→the slot→the internal rail communication→the apparatus control module unit the internal rail communication→the slot→ the one-way output module unit 120→the reception host 2.

Figure 2:
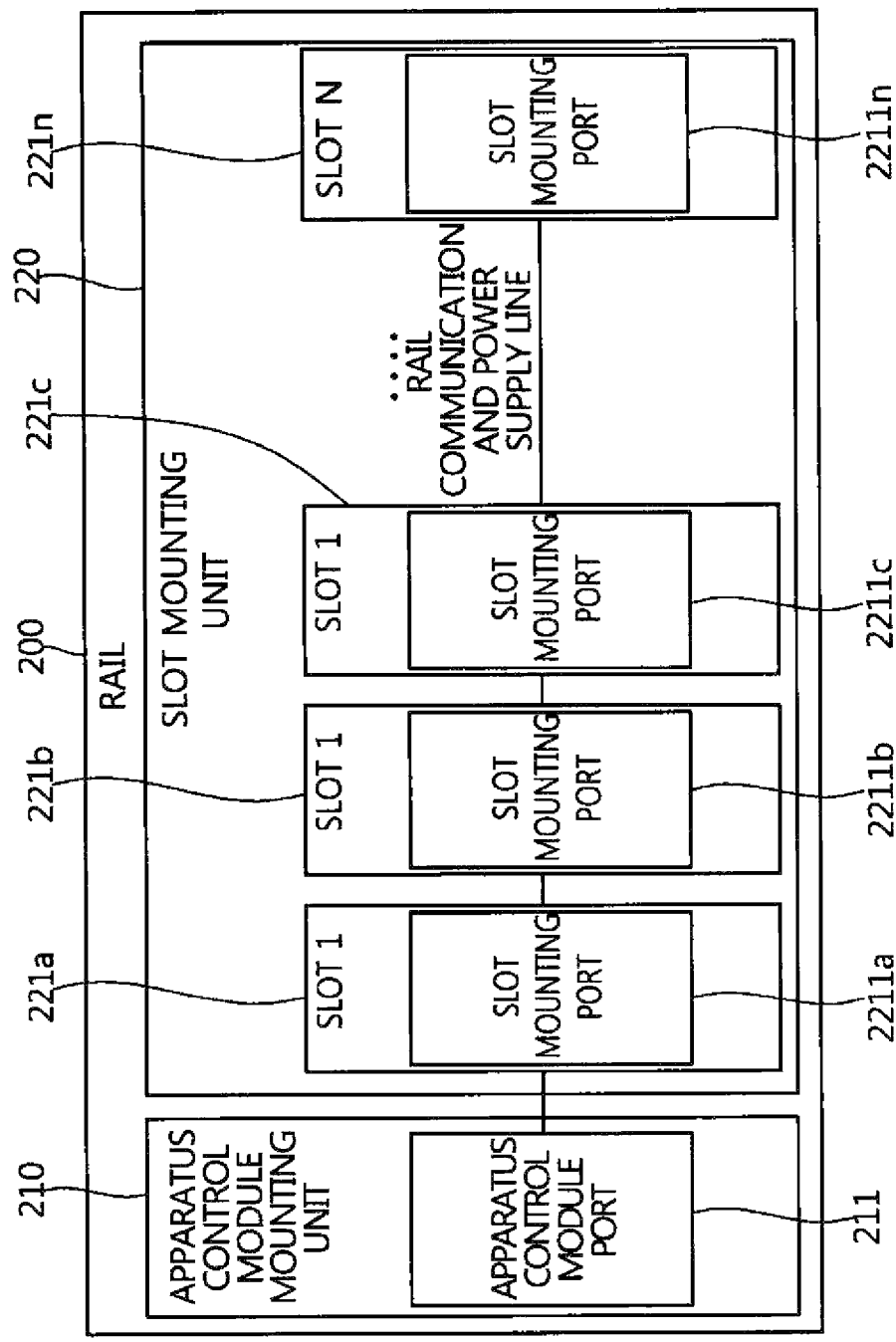
FIG. 2 is a structure diagram illustrating a rail in which an apparatus for multilateral one-way communication according to an embodiment of the present invention is installed.
Figure 3:
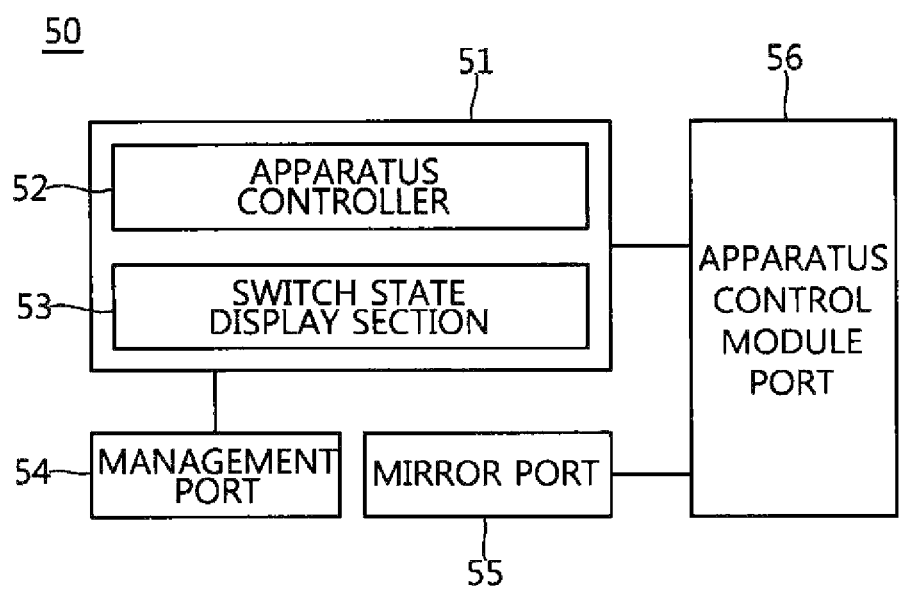
FIG. 3 is an internal configuration diagram of the apparatus control module unit shown in FIG. 1.

FIG. 2 is a structure diagram illustrating a rail in which the apparatus for multilateral one-way communication according to the embodiment of the present invention is installed, and FIG. 3 is an internal configuration diagram of the apparatus control module unit illustrated in FIG. 1.

The apparatus for multilateral one-way communication according to the embodiment of the present invention is installed in the rail 200. That is, when the apparatus for multilateral one-way communication according to the embodiment of the present invention is installed in the rail 200, the apparatus is mounted in the apparatus control module mounting unit 210 and the slot mounting unit 220 on the rail 200. The rail 200 provides communication lines between the module units and supplies power to the module units.

The apparatus control module mounting unit 210 is mounted therein with the apparatus control module unit 50. The apparatus control module mounting unit 210 includes an apparatus control module port 211 that provides a communication contact point. That is, the apparatus control module unit 50 mounted in the apparatus control module mounting unit 210 may be regarded to be coupled with the rail 200 through the apparatus control module port 211.

The slot mounting unit 220 includes a plurality of slots 221a to 221n. The slots 221a to 221n are provided with slot mounting ports 2211a to 2211n that provide communication contact points, respectively. In the slots 221a to 221n, the one-way input module unit 110, the one-way output module unit 120, and the two-way module unit are mounted.

A rail communication and power supply line illustrated in FIG. 2 provides a communication contact point between the slots 221a to 221n and the apparatus control module unit 50, and supplies power. The rail communication and power supply line use two-way communication.

In other words, the slots 221a to 221n transmit/receive data (packets) through the one-way input module unit and the one-way output module unit in one direction, and transmit/receive data through the two-way module unit in a bidirectional mode. To this end, the slots 221a to 221n include ports (that is, the slot mounting ports 2211a to 2211n) in which modules may be mounted. N input modules (that is, one-way input module units) and M output modules (that is, one-way output module units) are mounted according to user environments, so that it is possible to configure an N:M type of one-way communication. Furthermore, a network may be situationally separated into for example, configurations of an input module: two-way module, and a two-way module: output module.

The apparatus control module unit 50 mounted in the one-way input module unit 110 includes an apparatus controller 52, a switch state display 53, a management port 54, a mirror port 55, and an apparatus control module port 56 as illustrated in FIG. 3.

The apparatus controller 52 according to the embodiment of the present invention takes charge of an environment setting of the apparatus for multilateral one-way communication, reception and transmission functions of packets, and association of ports.

The switch state display 53 displays the state of a switch, a communication state of the apparatus for multilateral one-way communication, and the like.

The apparatus controller 52 and the switch state display 53 may be configured as one module 51.

The management port 54 is a contact point that sets the environment setting of the apparatus controller 52, and is connected to an external management terminal (not illustrated) for state checking and the like.

The mirror port 55 is a contact point capable of mirroring traffic communicated through the apparatus for multilateral one-way communication according to the embodiment of the present invention.

The apparatus control module port 56 is a part coupled with the rail 200 and provides a communication section of the network.

Figure 4:
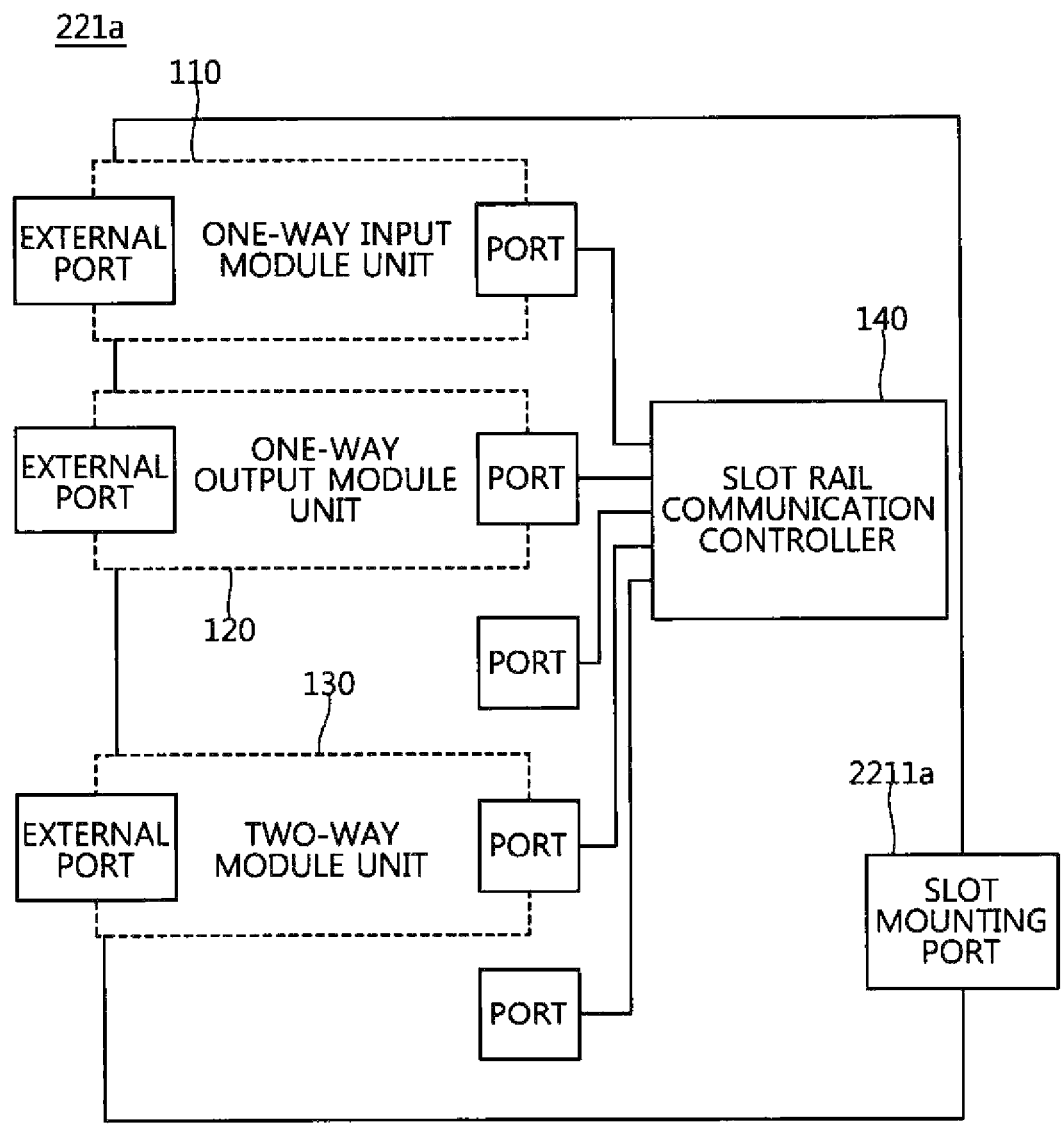
FIG. 4 is a diagram illustrating the structure of one of a plurality of slots shown in FIG. 2.

FIG. 4 is a diagram illustrating the structure of one of the plurality of slots illustrated in FIG. 2, and illustrates a module unit that may be mounted in the slot 221a of the plurality of slots 221a to 221n.

In the slot 221a, the one-way input module unit 110, the one-way output module unit 120, and the two-way module unit 130 may be mounted. The one-way input module unit 110 and the one-way output module unit 120 actually perform one-way communication. The one-way input module unit 110 has a communication function with an external network and a function of transmitting received data in one direction. The one-way output module unit 120 has a one-way reception function and a function of transmitting data to an external network. Through this, physical one-way directionality of communication is ensured. The two-way module unit 130 provides a data transmission/reception function and provides an internal transmission/reception function.

The slot 221a has a slot rail communication controller 140 therein for the purpose of internal communication. The slot rail communication controller 140 may receive or transmit data transmitted through ports (that is, the ports of FIG. 4). That is, the slot rail communication controller 140 serves as an intermediate path (that is, an intermediator for rail communication) of data communicated through the one-way input module unit 110, the one-way output module unit 120, and the two-way module unit 130.

The slot mounting port 2211a is a part coupled with the rail 200 and provides a communication section of the network.

In FIG. 4, the ports provide communication sections of the network with the mounting units and the respective module units of the one-way input module unit 110, the one-way output module unit 120, and the two-way module unit 130.

In FIG. 4, the external ports are contact points (e.g., LAN cable mounting parts) connected to an external transmission host.

As illustrated in FIG. 4, when all of the one-way input module unit 110 and the one-way output module unit 120 are mounted in one slot 221a, data received in the one-way input module unit 110 is transferred to the one-way output module unit 120 via the slot rail communication controller 140. That is, when all of the one-way input module unit 110 and the one-way output module unit 120 are mounted in one slot 221a, data does not pass through the apparatus control module unit 50.

However, when the one-way input module unit 110 is mounted in one slot 221a and the one-way output module unit 120 is mounted in another slot (e.g., 221b), data received in the one-way input module unit 110 is to be transferred to the one-way output module unit 120 via the slot rail communication controller 140 by passing through the apparatus control module unit 50.

Figure 5:
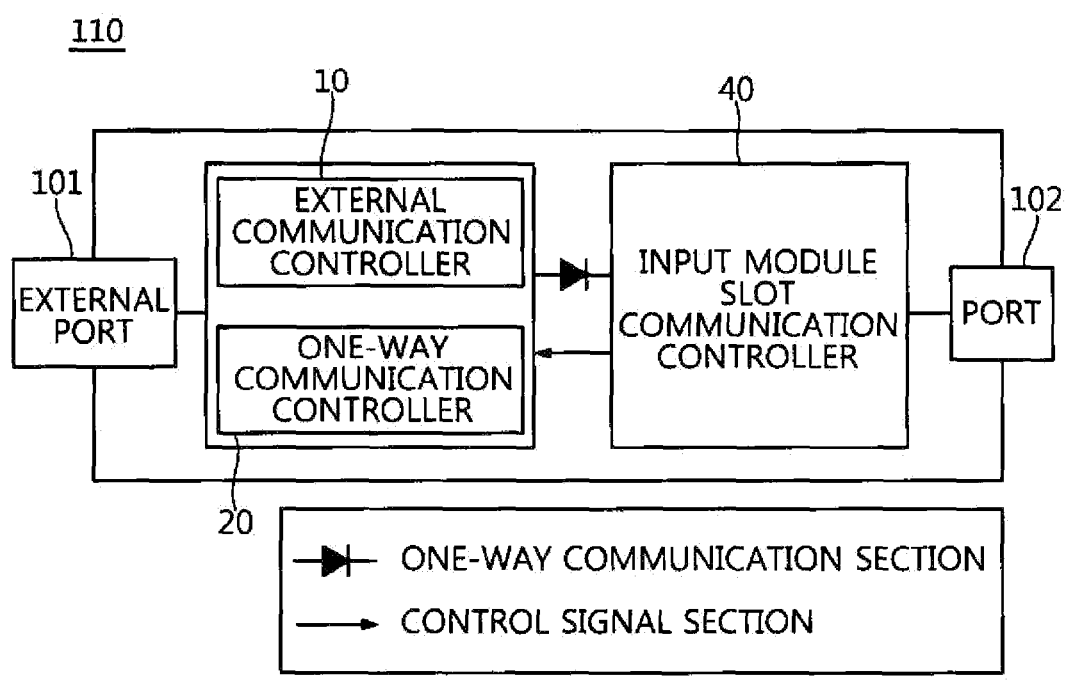
FIG. 5 is a diagram schematically illustrating the internal structure of a one-way input module unit shown in FIG. 4.

FIG. 5 is a diagram schematically illustrating the internal structure of the one-way input module unit illustrated in FIG. 4.

The one-way input module unit 110 includes the external communication controller 10 that controls communication with an external network, the one-way communication controller 20 that performs one-way communication, and the input module slot communication controller 40 that communicates with the slots. FIG. 5 does not illustrate the one-way communication controller 30 for the purpose of the simplification of the drawing, but the one-way communication controller 20 of FIG. 5 may be an element including the one-way communication controller 30.

In FIG. 5, an external port 101 is a contact point (e.g., a LAN cable mounting part) connected to an external transmission host, and port 102 is a part coupled with the corresponding slot 221*a*.

The configuration of the one-way input module unit 110 has been described in detail in FIG. 1.

Figure 6:
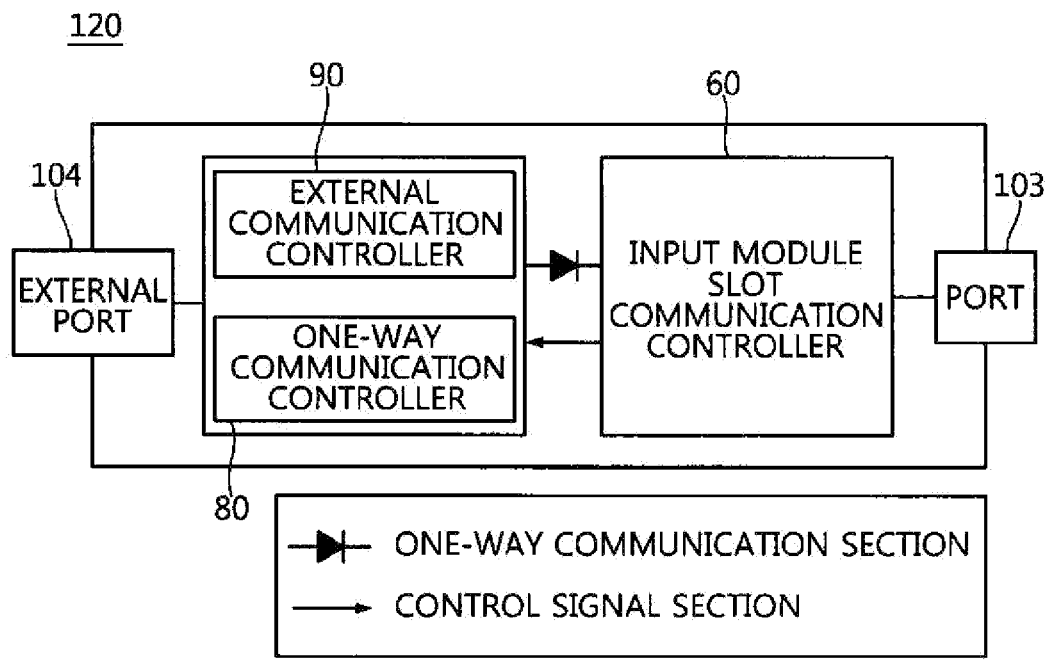
FIG. 6 is a diagram schematically illustrating the internal structure of a one-way output module unit illustrated in FIG. 4.

FIG. 6 is a diagram schematically illustrating the internal structure of the one-way output module unit illustrated in FIG. 4.

The one-way output module unit 120 includes the external communication controller 90 that controls communication with an external network, the one-way communication controller 80 that performs one-way communication, and the output module slot communication controller 60 that communicates with the slots. FIG. 6 does not illustrate the one-way communication controller 70 for the purpose of the simplification of the drawing, but the one-way communication controller 80 of FIG. 6 may be an element including the one-way communication controller 70.

In FIG. 6, the external port 104 is a contact point (e.g., LAN cable mounting parts) connected to an external transmission host, and the port 103 is a part coupled with the corresponding slot 221*a*.

The configuration of the one-way output module unit 120 has been described in detail in FIG. 1.

Figure 7:
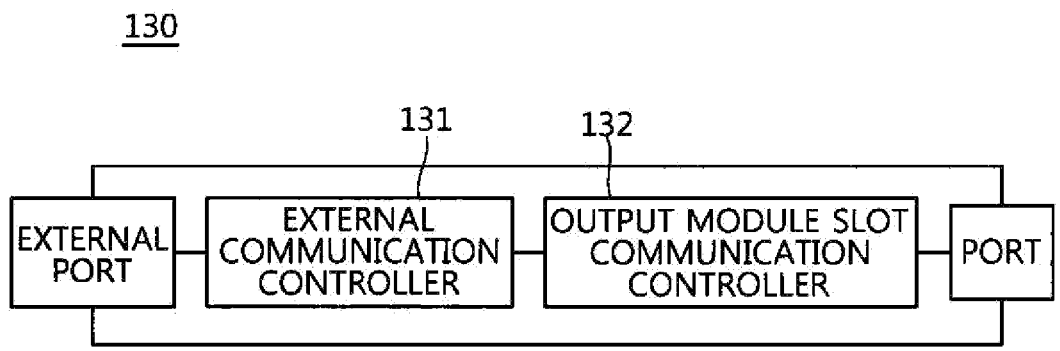
FIG. 7 is a diagram schematically illustrating the internal structure of a two-way module unit shown in FIG. 4.

FIG. 7 is a diagram schematically illustrating the internal structure of the two-way module unit illustrated in FIG. 4.

The two-way module unit 130 includes an external communication controller 131 that controls communication with an external network, and an output module slot communication controller 132 that communicates with the slots.

In FIG. 7, the external port is a contact point (e.g., LAN cable mounting parts) connected to an external transmission host, and the port is a part coupled with the corresponding slot 221*a*.

Figure 8:
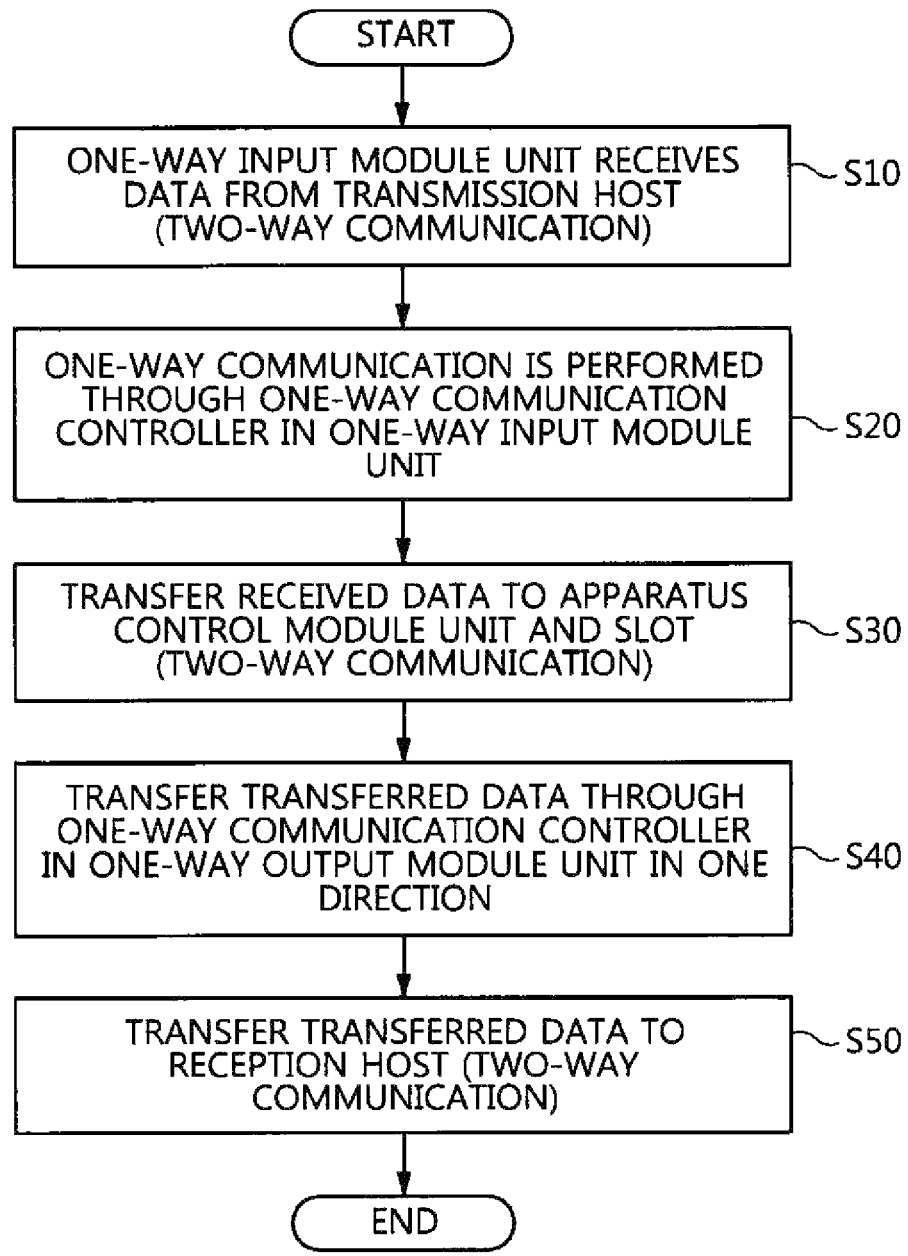
FIG. 8 is a flowchart explaining a method for multilateral one-way communication according to an embodiment of the present invention.

FIG. 8 is a flowchart for explaining a method for multilateral one-way communication according to the embodiment of the present invention.

First, the one-way input module unit 110 receives data from the transmission host 1 through the external port 101 (S10). At this time, since two-way communication is used in a communication section between the transmission host 1 and the one-way input module unit 110, the data loss attributable to the apparatus for multilateral one-way communication does not occur.

Next, one-way communication, in which only data transmission is possible from the outside of the apparatus to the inside of the apparatus, is performed through the one-way communication controllers 20 and 30 in the one-way input module unit 110 (S20). At this time, in the one-way communication, since it is not possible to know the state of a reception state, loss may occur. Accordingly, the feedback processing module unit 24 and the feedback generation module unit 34 are used. Since a physical signal is used between the feedback processing module unit 24 and the feedback generation module unit 34, the utilization to an external intrusion path is not possible.

Data received in the one-way input module unit 110 is transferred to the apparatus control module unit 50 and the slot (a corresponding slot of the slots 221*a* to 221*n*) through the rail communication according to setting (S30). At this time, since two-way communication is performed, data loss does not occur.

Then, data of a slot to be transmitted to an external network is transferred to the one-way output module unit 120 through the rail communication (S40). The transferred data is transferred through the one-way communication controllers 70 and 80 in the one-way output module unit 120 in one direction. At this time, there is no path in which external intrusion is possible. Furthermore, data reliability of a one-way communication section of the network is ensured through the feedback processing module unit 74 and the feedback generation module unit 84.

Last, the one-way output module unit 120 transfers the transferred data to the reception host 2 through the external communication controller 90 (S50). At this time, two-way communication is used and an input port and an output port is decided according to the setting of the apparatus control module unit 50 regardless of the position of a slot.

The aforementioned description relates to the apparatus including the one-way input module unit 110 and the one-way output module unit 120. In the present invention, all of the input module unit and the output module unit have accesses to one-way communication sections of the network. Thus, according to situations, even though only one of the one-way input module units and the one-way output module unit are used, physical one-way communication can be achieved. However, it is probable that there will be interference (attacks, loads and the like) between hosts of connection units using a two-way module unit.

The apparatus of the above-mentioned configuration according to the present invention can transfer packets from an internal network to an external network while fundamentally blocking the probability of intrusion from the external network.

Furthermore, the apparatus of the present invention may be installed at an association point where the highest security level is required, so that it is possible to fundamentally block intrusion.

In addition to guaranteeing the reliability of data transmission in a one-way communication section, the apparatus of the present invention can provide an optimal N:M configuration according to the environment or service of a network to be used as needed by the user, with the concomitant guarantee of optimal performance.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An apparatus for multilateral one-way communication, comprising:
   a one-way input module unit, detachably mounted to a plurality of slots formed in a rail, for receiving data from an external transmission host and for transmitting the received data to inside of the apparatus through one-way communication;
   a one-way output module unit, mounted detachably to the plurality of slots formed in the rail, for transferring data of interest to the inside of the apparatus through one-way communication, the data of interest being to be transmitted to outside of the apparatus, and transmitting the transferred data to an external reception host; and
   a two-way module unit, mounted detachably to the plurality of slots formed in the rail, for performing data communication between the transmission host and the reception host in a bidirectional mode, wherein the rail comprises:

an apparatus control module mounting unit in which an apparatus control module unit for controlling transmission/reception of the data is mounted; and a slot mounting unit in which the plurality of slots are mounted.

2. The apparatus of claim 1, wherein the one-way input module unit comprises:

an external port connected to the transmission host;

an external communication controller for receiving data from the transmission host in a bidirectional mode of communication with the transmission host;

a one-way communication controller for transmitting data received from the external communication controller to the inside of the apparatus in one direction;

an input module slot communication controller for transmitting the data received via the one-way communication controller according to an internal rail communication standard; and a port coupled with a currently mounted slot.

3. The apparatus of claim 2, wherein the one-way communication controller comprises:

a one-way transmission module unit for transmitting data from the external communication controller through a physical one-way section;

a one-way reception module unit for receiving data transmitted through the physical one-way section;

a feedback generation module unit for feeding back a reception result for the data through a control signal section, the data being transmitted through the physical one-way section; and a feedback processing module unit for receiving the data reception result fed back through the control signal section.

4. The apparatus of claim 1, wherein the one-way output module unit comprises:

an external port connected to the reception host;

an output module slot communication controller for interpreting information received through internal rail communication to extract data;

a one-way communication controller for transmitting data to the inside of the apparatus through a physical one-way section, the data being received through the output module slot communication controller;

an external communication controller for transmitting data from the one-way communication controller to the reception host in a bidirectional mode of communication with the reception host; and a port coupled with a currently mounted slot.

5. The apparatus of claim 4, wherein the one-way communication controller comprises:

a one-way transmission module unit for transmitting data from the output module slot communication controller through the physical one-way section;

a one-way reception module unit for receiving data transmitted through the physical one-way section;

a feedback generation module unit for feeding back a reception result for data through a control signal section, the data being transmitted through the physical one-way section; and a feedback processing module unit for receiving the data reception result fedback through the control signal section.

6. The apparatus of claim 1, wherein each of the plurality of slots comprises:

a slot rail communication controller for receiving or transmitting data transmitted through any one of the one-way input module unit, the one-way output module unit, and the two-way module unit.

7. The apparatus of claim 6, wherein any one of the plural slots is mounted with N one-way input module units and M one-way output module units.

8. The apparatus of claim 6, wherein any one of the plurality of slots is mounted with the one-way input module unit and the two-way module unit.

9. The apparatus of claim 6, wherein any one of the plurality of slots is mounted with the one-way output module unit and the two-way module unit.

10. A method of multilateral one-way communication, comprising:

receiving, by a one-way input module unit mounted detachably to a plurality of slots formed in a rail, data from an external transmission host, wherein two-way communication is performed between the one-way input module unit and the external transmission host;

transferring, by the one-way input module unit, the received data through a one-way communication controller in the one-way input module unit in one direction, wherein the one-way communication controller feeds back a reception result for the received data through a control signal section to ensure a reliable data transfer, and temporarily stores the data so that the data is used in correcting loss of the data during communication;

receiving, by an apparatus control module unit mounted in the rail, data from the one-way input module unit through rail communication, wherein two-way communication is performed between the apparatus control module unit and the one-way input module unit;

transferring, by the apparatus control module unit, the received data to a one-way output module unit mounted in an external transmission slot through rail communication, wherein two-way communication is performed between the apparatus control module unit and the one-way output module unit;

transferring, by the one-way output module unit, the received data through a one-way communication controller in the one-way output module unit in one direction, wherein the one-way communication controller feeds back a reception result for the received data through a control signal section to ensure a reliable data transfer, and temporarily stores the data so that the data is used in correcting loss of the data during communication; and transferring, by the one-way output module unit, the data received in one direction to an external reception host, wherein two-way communication is performed between the one-way output module unit and the external reception host.

* * * * *